June 23, 1925.

E. P. KOKESCH ET AL 1,543,442

EXTENSION TABLE

Filed May 29, 1923 — 5 Sheets-Sheet 1

INVENTORS.

June 23, 1925.  1,543,442

E. P. KOKESCH ET AL

EXTENSION TABLE

Filed May 29, 1923  5 Sheets-Sheet 2

INVENTORS.
E. P. Kokesch
W. F. Saunier
By Egerton R. Case
Atty.

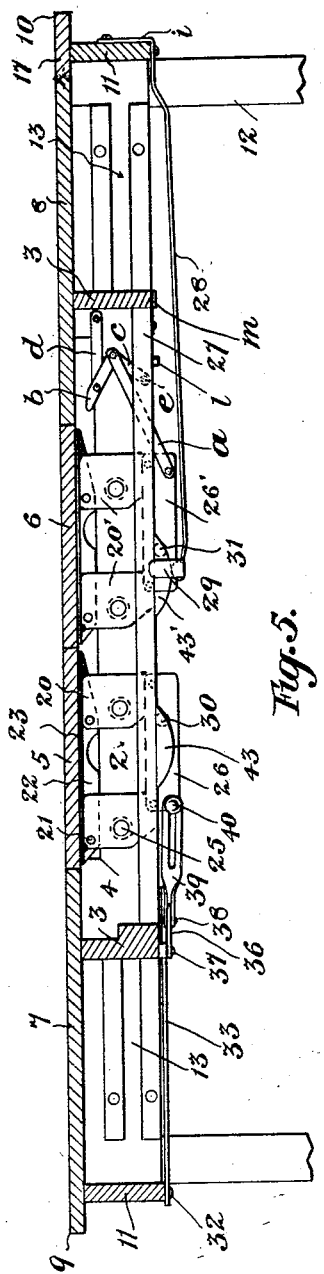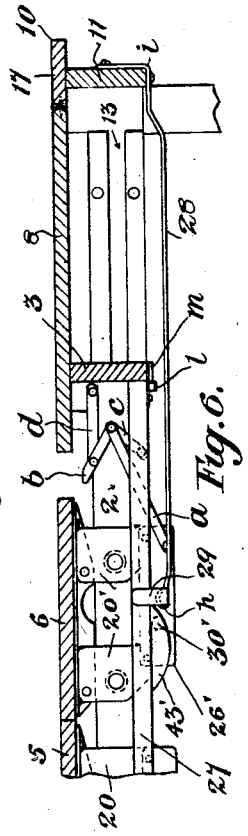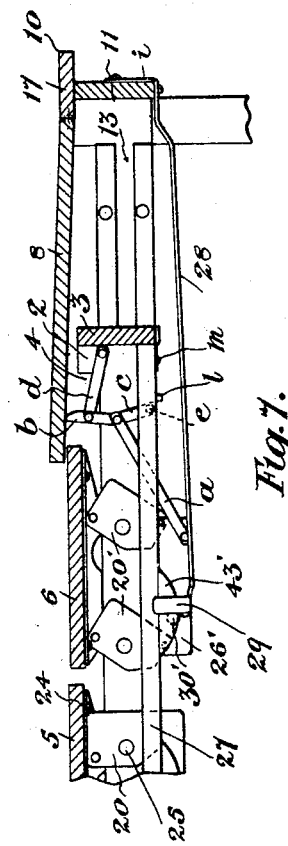

June 23, 1925. 1,543,442

E. P. KOKESCH ET AL

EXTENSION TABLE

Filed May 29, 1923 5 Sheets-Sheet 4

INVENTORS
E. P. Kokesch
W. H. Saunier
By Egerton R. Case
Atty.

Patented June 23, 1925.

1,543,442

UNITED STATES PATENT OFFICE.

EDWARD PETER KOKESCH, OF PRIMATE, SASKATCHEWAN, AND WILLIAM FRANK SAUMER, OF HAYTER, ALBERTA, CANADA.

EXTENSION TABLE.

Application filed May 29, 1923. Serial No. 642,331.

*To all whom it may concern:*

Be it known that we, EDWARD PETER KOKESCH and WILLIAM FRANK SAUMER, both subjects of the King of Great Britain, and residing, respectively, in Primate, in the Province of Saskatchewan, Canada, and in Hayter, in the Province of Alberta, Canada, have jointly invented certain new and useful Improvements in Extension Tables, of which the following is a specification.

Our invention relates to improvements in extension tables, and the object of the invention is to store the extension leaves in the table when not in use, and to permit the same to be positioned for use or storing away by the mere act of extending or contracting the table, and in the following specification we shall describe a disclosure within our invention, and what we claim as new will be set forth in the claims forming part of this specification.

Figure 1:
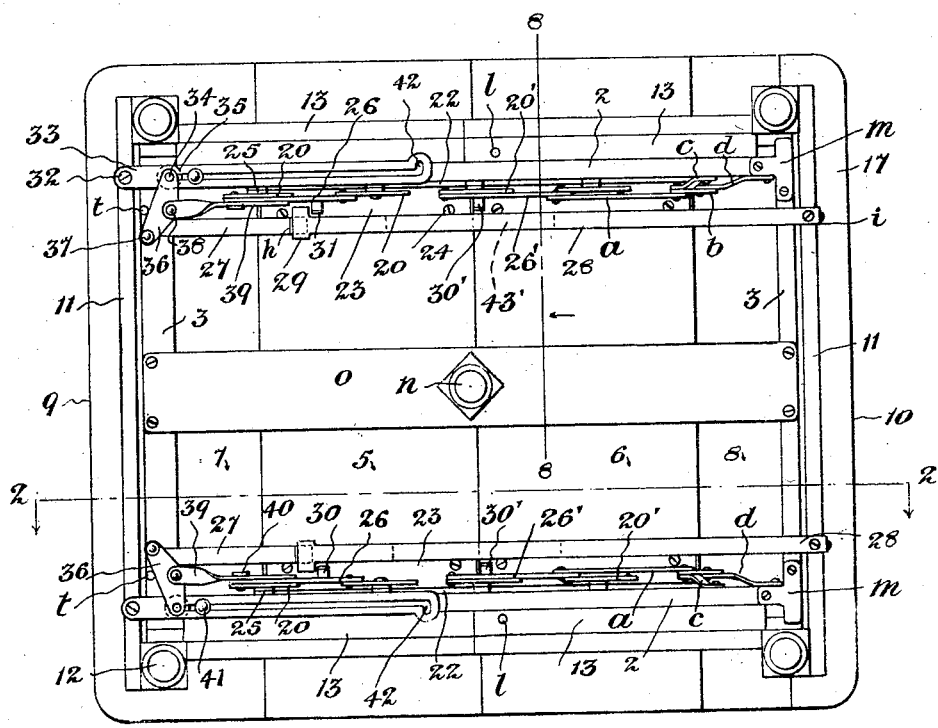
Figure 2:
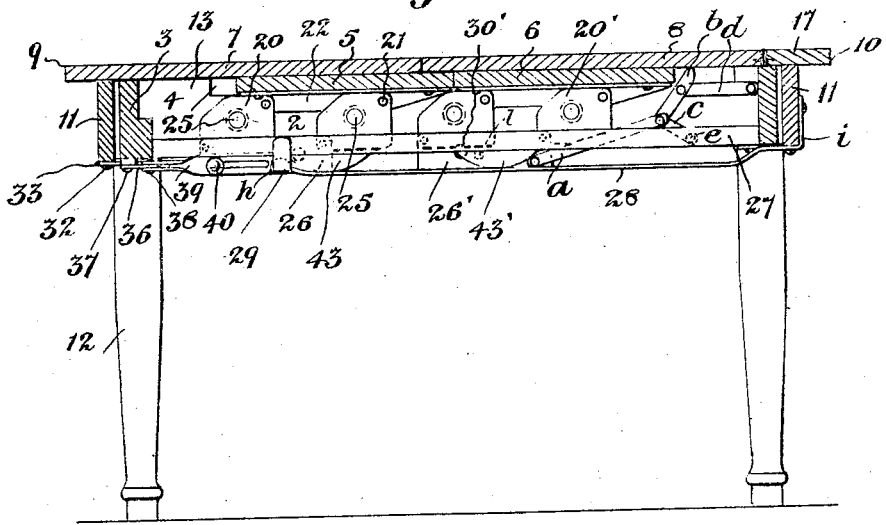
Figure 3:
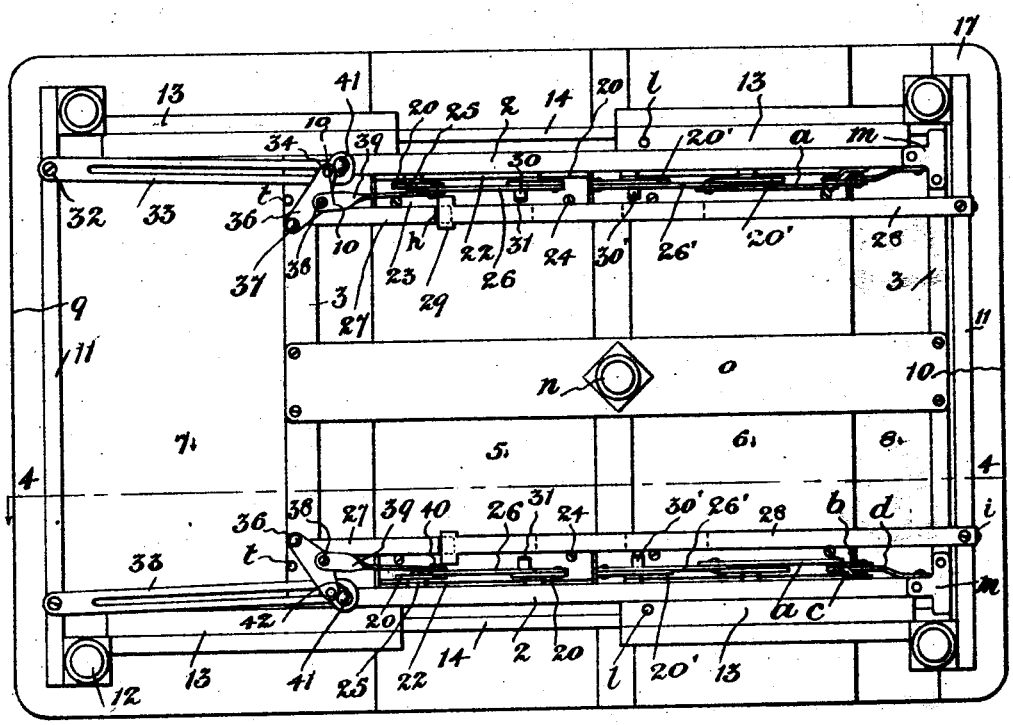
Figure 4:
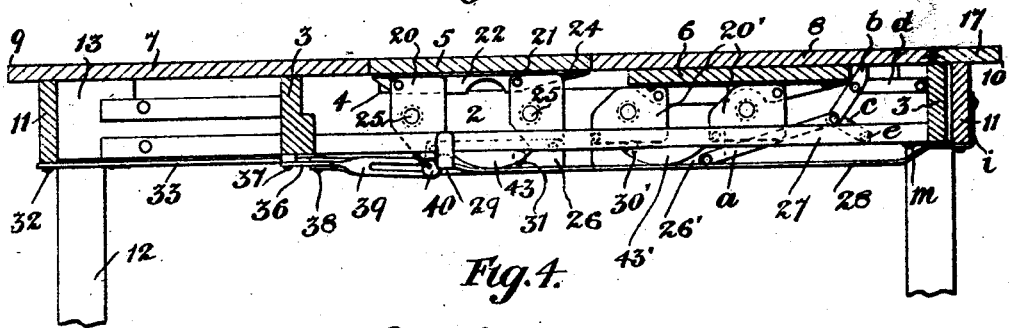
Figure 8:
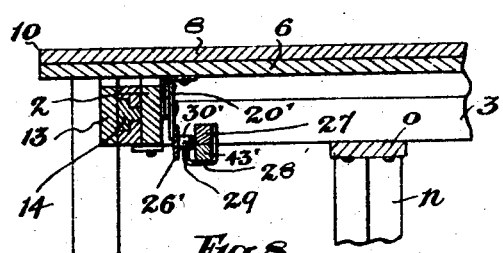
Figure 11:
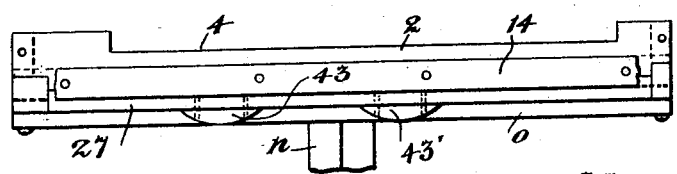
Figure 10:
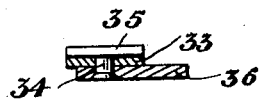
Figure 12:
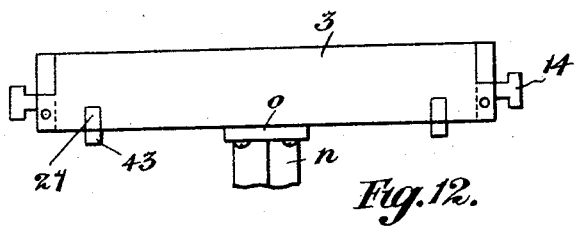
Figure 13:
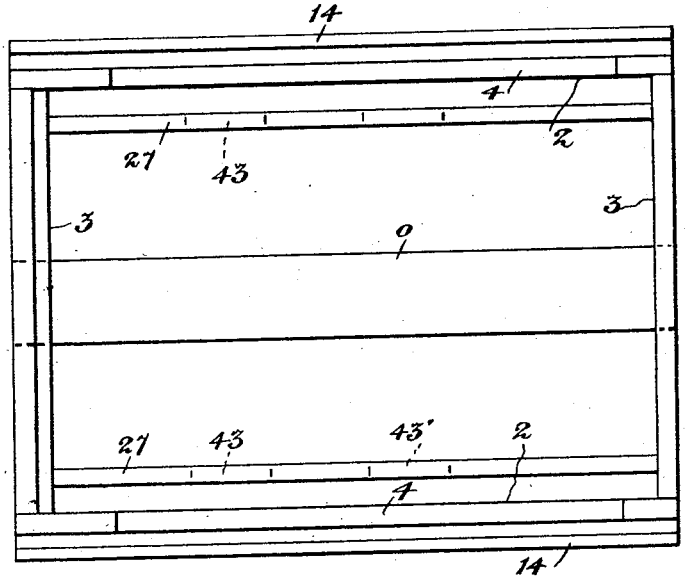
Figure 9:
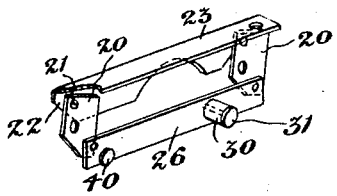
Figure 14:
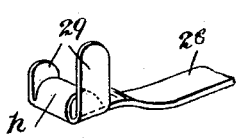
Figure 15:
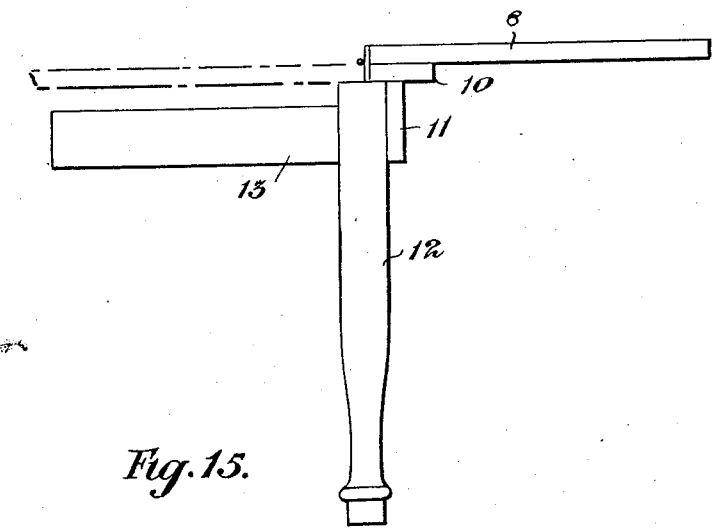
Figure 16:
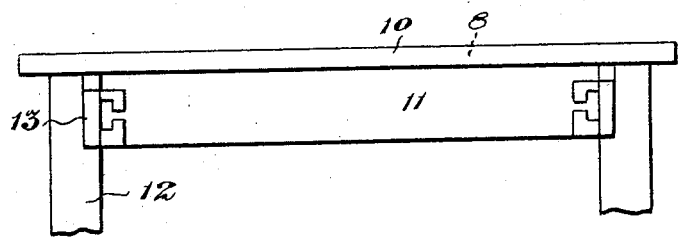

Fig. 1 is a plan view of the underside of the table closed, and Fig. 2 is a vertical longitudinal section on the line 2—2, Fig. 1. Fig. 3 is a plan view of the underside of the table with one of the leaves in use, and Fig. 4 is a vertical longitudinal section on the line 4—4, Fig. 3. Fig. 5 is a vertical longitudinal section through the table with both leaves in use. Fig. 6 is a section somewhat similar to Fig. 5 except that the table is extended to its limit to permit certain means to act to permit the storing of one or more leaves as the table is contracted, and Fig. 7 is a view similar to Fig. 6 showing certain means in action for lifting a hinged portion of the top of the table to permit the leaves to be stored as the leaves are contracted. Fig. 8 is a cross section on the line 8—8, Fig. 1. Fig. 9 is an isometric view of certain bell-crank levers which operate to change the longitudinal movement of certain members of the table into a vertical movement in either direction. Fig. 10 is a cross section on the line 10—10, Fig. 3. Figs. 11 and 12 are side and end elevations respectively of the frame to which the bell-crank levers shown in Fig. 9 are pivoted. Fig. 13 is a plan view of the frame referred to in Figs. 11 and 12. Fig. 14 is a perspective view of the inner end of the bars whereby the mechanism illustrated in Fig. 9 is actuated as the table is extended and contracted, and Figs. 15 and 16 are side and end elevations respectively of the end section of the table provided with a hinged leaf.

In the drawings, like characters of reference refer to the same parts.

Obviously the table may be provided with more than two extension leaves, or it may be provided with one extension leaf only.

Broadly considered, the invention comprises a non-extensible rectangular shaped middle frame and two end sections slidably associated therewith, one of said sections being provided with a hinged leaf, one or more leaves which are pivotally united with the sides of said middle frame, and means is associated with one of said end sections to actuate the pivoting means for said leaves to raise and lower the same, as the case may be according to whether the table is expanded or contracted.

The middle frame (Fig. 13) is rectangular in shape and comprises side rails 2 and end rails 3. The said side rails are cut away as shown at 4 so that when the table is completely closed as shown in Figs. 1 and 2, the extension leaves 5 and 6 will be housed underneath the leaves 7 and 8 of the end sections 9 and 10 respectively, which end sections comprise end rails 11 associated each with a pair of legs 12. Also associated with each end rail and pair of legs are rails 13 which are grooved to accommodate the tongues 14 associated with the side rails 2 of the middle frame (see particularly Fig. 8). The leaf 7 of the end section 9 of the table is fixed, whereas the leaf 8 of the end section 10 is hinged to a leaf rail 17 fixedly carried by said end section 10.

In the disclosure herein, we have shown two inner or extension leaves 5 and 6: these inner leaves are coupled at each end to the side rails 2 of the middle frame so that as the end sections 9 and 10 are opened or closed, the said leaves 5 and 6 will be actuated individually to be brought successively into the same plane as the leaves 7 and 8, or housed thereunder, as the case may be. The preferred means comprises a pair of bell-crank levers 20 each pivoted at 21 to the vertical flange 22 of a plate 23, which plate is secured each to the underside of its associated leaf 5 or 6, by such fastening means as screws 24, shown clearly in Figs.

1 and 3. By means of pivoting means 25 the levers 20 are pivoted to the inner sides of the side rails 2, and each pair of levers at each end of the leaves 5 and 6 are pivotally coupled together by a link 26, (see particularly Fig. 9).

The bars 27 are supported by the end rails 3 of the middle frame, and extend longitudinally thereof, and one at each side of this frame.

Suitably coupled to the end rail 11 of the end section 10 are a pair of resilient plates 28, which are located underneath the bars 27 and extend longitudinally thereof, and the function performed by these plates 28 is to actuate the lever mechanism for the inner leaves 5 and 6, as hereinafter more particularly explained.

As shown in Figs. 1 and 2 the inner or extension leaves 5 and 6 are housed underneath the levers 7 and 8, and we will consider the placing in position of the leaf 5. The head of each plate 28 is provided at each side with a flange 29 and these flanges straddle each their associated bar 27. The end section 9 is held stationary, and as the end section 10 is pulled away therefrom the shorter flange 29 of each plate 28 will engage with a sleeve 30 mounted on a pin 31 carried by each link 26, and the result is that the bell-crank levers 20 will be moved around their pivots 25, and consequently the extension leaf 5 will be moved from the position shown in Fig. 2, into the position shown in Fig. 4. During this operation of course the movement of the end section 10 will carry the leaf 6 thereof beyond the leaf 5, and it will be therefore necessary to move said end section 10 inwardly until its leaf 8 occupies the position shown in Fig. 4. This movement of course will move the head of each plate 28 to the left away from its associated sleeve 30.

Secured to the end rail 11 of the end section 9 as shown at 32 are a pair of longitudinally slotted plates 33 and operating in the slot of each plate is a pin 34 the head 35 of which operates against the upper sides of the said plates 33 (see Fig. 10). Each pin 34 is mounted in one end of levers 36, which levers are pivoted as shown at 37 to one of the end rails 3 of the middle frame. Pivoted to each lever 36 as shown at 38 is a longitudinally slotted link 39, and through the slot of each link passes a pin 40 carried by each link 26, having a head which operates against the inner side of its associated link to prevent the withdrawal of the pin. A stop 41 is carried by each of the side rails 2 (see Figs, 1 and 3), and these stops operate through the slots formed in the plates 33. Since the end section 9 is held stationary, the friction between the tongues 14 operating in the grooves formed in the rails 13 in the end section 10, will carry the middle frame with said end section, and the result is that the stops 41 will be moved to the inner end of each plate 33, and as further movement of the end section 10 is required to cause the heads of the plates 28 to actuate the lever mechanism associated with the extension leaf 5, as this lever mechanism is moved, each pin 40 will abut against the outer end of its associated link 39 and these through the medium of the levers 36, swing each plate 33 around its attaching means 32 and so cause the stops 41 to be located in the locking end 42 of the slot formed in each plate 33, and the result is that the middle frame illustrated in Fig. 13 will be held against movement underneath the end section 9, while the extension leaf 5 is moved against the fixed leaf 7.

Should it be desired to house the extension leaf 5, the end section 10 will be further opened thus moving therewith the resilient plates 28. As shown particularly in Fig. 14 one of the flanges 29 of the head of each plate 28 is shorter than its fellow, and when the said heads come in contact with the arc-shaped deflecting blocks 43, the said heads are moved downwardly, and consequently as said plates 28 move outwardly, the said shorter flanges 29 will not contact with the sleeves 30 of the lever mechanism of said leaf 5. When said heads escape said deflecting blocks 43 they will be moved against the underside of the bars 27, and therefore the shorter flanges 29 will be brought into contact with the said sleeves 30 when the end section 10 is moved inwardly with the result that the extension leaf 5 will be moved into the position shown in Fig. 2 underneath the leaf 7, and so occupy part of the cut away portion 4 of the middle frame. As the pins 40 operate in the slotted links 39, when they come to the outer ends of said slots they will move said links 39 to cause the levers 36 to move so that the pins thereof will actuate the slotted plates 33 to move the inner ends thereof outwardly thus in effect moving the stops 41 out of the locking ends 42 of said slotted plates 33 and locate said stops in alignment with the longitudinal slot formed in said plates 33 and so permit the parts to be moved into the position shown in Fig. 1.

To position the extension leaf 6 the extension leaf 5 must of course be previously positioned. This extension leaf is provided with lever mechanism identical to that disclosed in connection with the extension leaf 5, and when the heads of the plates 28 are drawn outwardly together with the end section 10, the shorter flange 29 of said heads will contact with the sleeves 30' carried by the link 26', with the result that the bell-crank levers 20' will be moved into the position shown in Figs. 5 and 6, and when the extension leaf 6 has been elevated fully the end section 10 will be moved inwardly a short distance so as to bring its leaf 8 in contact with the leaf 6.

The bars 27 are provided with a second pair of deflecting blocks 43' which will co-act with the head of each plate 28 to permit the shorter flanges 29 to pass underneath the sleeves 30' so that the said heads may be positioned in respect of said sleeves 30' as shown in Fig. 6. Now when it is desired to house either or both of the extension leaves 5 and 6, some means must be provided to prevent the leaf 8 conflicting with the leaf 6 when it is in the position shown in Figs. 5 and 6. After the head of each plate 28 passes by the deflecting blocks 43', the said heads move up into contact with the underside of the bars 27, and consequently the shorter flanges 29 will come in contact with the sleeves 30' when the end section 10 is moved inwardly. From what has been stated it will be seen that the end section 10 must be moved into the position shown in Fig. 6 before either of the said leaves 5 and 6 can be housed, and this is for the purpose of positioning the heads of the plates 28 in respect of the sleeves 30'. As the shorter flanges 29 of the heads of the plates 28 come in contact with the sleeves 30' when the end section 10 of the table is moved inwardly, the links 26', will move the links $a$ pivoted thereto into the position shown in Fig. 7, and as the links $a$ are pivoted to the inner ends of the toggle arms $b$ and $c$, and as the toggle arm $b$ is pivoted to the link $d$, (which link is pivoted to one end of the side rails 2, and the toggle arm $c$ is pivoted at $e$ also to the side rails 2) immediately the extension leaf 6 starts to move downwardly around its bell-crank levers 20', the outer end of the toggle arms $b$ contact with the free side of the leaf 8, thus elevating this leaf as shown clearly in Fig. 7 to prevent interference with the leaf 6.

As the lever mechanism for the leaf 6 continues to lower said leaf, the toggle arms $b$ and $c$ will be ultimately moved into the position shown in Fig. 4.

The head of each plate 28 is shaped as shown at $h$ so as to provide ease of movement for these heads over the deflecting blocks 43 and 43'.

The outer ends of the resilient plates 28 are suitably coupled to the end rails 11, as shown at $i$ so as to prevent lateral displacement of the heads of said plates in respect of the bars 27 in combination with the flanges 29 of said heads.

In order to prevent the end section 10 of the table being pulled out of engagement with the middle frame, I provide the rails 13 of said end section with stops $l$ which abut against plates $m$ when the said end section occupies the position shown in Fig. 6.

To support the middle frame, we show the same as provided with a leg $n$ which is carried by a bar $o$ attached in any suitable manner to the end rails 3.

Stops $t$ are carried by the end rails 3 of the middle section which limit the outward movement of the levers 36 and so prevent any possibility of the binding of pins 34 in the slotted plates 33 and the pins 40 in the slotted links 39.

What we claim is:

1. In a collapsible table in combination a middle frame; a leg-provided end section co-operatively associated with each end of said middle frame, one of said end sections having a hinged leaf; a pair of extension leaves pivotally associated at each side of said middle frame; means carried by said leaf-provided end section to actuate said pivoting means for said extension leaves to raise and lower said leaves; means pivoted to said middle frame and to the actuating means for one of said extension leaves and adapted to raise the leaf of one of said end sections to prevent interference between same and the adjacent extension leaf; means carried by the other of said end sections and adapted to lock said middle frame in position when either or both of said extension leaves have been raised or lowered, and means co-operatively associated with the pivoting means of one of said extension leaves to unlock said locking means prior to the closing of the table.

2. In a collapsible table in combination a middle frame; a pair of longitudinal bars carried thereby, each bar being provided on its underside with a pair of deflecting blocks; a leg-provided end section co-operatively associated with each end of said middle frame; an extension leaf; a pair of bell-crank levers pivotally associating said extension leaf at each end to each side of said middle frame; a link connecting each pair of bell-crank levers; a pair of resilient plates attached to one of said end sections and extending longitudinally of said bars, and each having a head comprising a pair of spaced flanges of unequal height, adapted to straddle said bars; a stop carried by each of said links with which the shorter of said flanges co-acts as the table is opened or closed to actuate the lever mechanism for said extension leaf; said heads being moved downwardly by said deflecting blocks to cause said shorter flanges to pass below said stops when it is desired to close the table; means carried by the other of said end sections and adapted to lock said middle frame in position when said extension leaf is raised, and means co-operatively associated with the pivoting means for said extension leaf to unlock said locking means prior to the closing of the table.

3. In a collapsible table in combination a middle frame; a leg-provided end section co-operatively associated with each end of said middle frame, one of said end sections having a hinged leaf; a pair of extension leaves; a pair of bell-crank levers pivotally associating said extension leaves at each end to each side of said middle frame; a link connecting each pair of bell-crank levers; a pair of resilient plates attached to one of said end sections and extending longitudinally of said bars, and each having a head comprising a pair of spaced flanges of unequal height, adapted to straddle said bars; a stop carried by each of said links with which the shorter of said flanges co-acts as the table is opened or closed to actuate the lever mechanism for said extension leaf; said heads being moved downwardly by said deflecting blocks to cause said shorter flanges to pass below said stops when it is desired to close the table; means carried by the other of said end sections and adapted to lock said middle frame in position when said extension leaf is raised; means co-operatively associated with the pivoting means for said extension leaf to unlock said locking means prior to the closing of the table, and means for elevating the leaf carried by one of said end sections when the table is to be closed to prevent interference between this leaf and the adjacent extension leaf.

4. In a collapsible table in combination a middle frame; a leg-provided end section co-operatively associated with each end of said middle frame; one of said end sections being provided with a hinged leaf; an extension leaf pivotally associated at each side of said middle frame; means whereby when the table is opened and closed, said extension leaf will be raised and lowered, and means pivoted to said middle frame and associated with the pivoting means for said extension leaf and adapted to be moved when said pivoting means is moved to elevate the leaf hinged to one of said end section to prevent interference between the same and said extension leaf when the table is opened and closed.

EDWARD PETER KOKESCH.
WILLIAM FRANK SAUMER.